(12) United States Patent
Jin et al.

(10) Patent No.: US 10,311,865 B2
(45) Date of Patent: Jun. 4, 2019

(54) SYSTEM AND METHOD FOR AUTOMATED SPEECH RECOGNITION

(71) Applicant: The Penn State Research Foundation, University Park, PA (US)

(72) Inventors: Dezhe Jin, State College, PA (US); Phillip Baker Schafer, State College, PA (US)

(73) Assignee: THE PENN STATE RESEARCH FOUNDATION, University Park, PA (US)

( * ) Notice: Subject to any disclaimer, the term of this patent is extended or adjusted under 35 U.S.C. 154(b) by 0 days.

(21) Appl. No.: 15/029,510

(22) PCT Filed: Oct. 14, 2014

(86) PCT No.: PCT/US2014/060420
§ 371 (c)(1),
(2) Date: Apr. 14, 2016

(87) PCT Pub. No.: WO2015/057661
PCT Pub. Date: Apr. 23, 2015

(65) Prior Publication Data
US 2016/0260429 A1    Sep. 8, 2016

Related U.S. Application Data

(60) Provisional application No. 61/890,571, filed on Oct. 14, 2013.

(51) Int. Cl.
*G10L 15/20*    (2006.01)
*G10L 15/08*    (2006.01)
(Continued)

(52) U.S. Cl.
CPC ............. *G10L 15/20* (2013.01); *G10L 15/02* (2013.01); *G10L 15/063* (2013.01); *G10L 15/08* (2013.01);
(Continued)

(58) Field of Classification Search
None
See application file for complete search history.

(56) References Cited

U.S. PATENT DOCUMENTS 5,619,717 A    4/1997 Staats
5,848,384 A    12/1998 Hollier et al.
(Continued)

FOREIGN PATENT DOCUMENTS

EP    1063635    12/2000

OTHER PUBLICATIONS

Waibel, Alex. "Modular construction of time-delay neural networks for speech recognition." Neural computation 1.1 (1989): 39-46.*
(Continued)

*Primary Examiner* — Michael N Opsasnick
(74) *Attorney, Agent, or Firm* — Dinsmore & Shohl, LLP

(57) ABSTRACT

A method of recognizing speech. The method includes the steps of obtaining an auditory signal; processing the auditory signal into a plurality of frequency components; processing the plurality of frequency components using a plurality of feature detectors, each feature detector producing a feature detector response; generating a spike for each instance in which a feature detector response identifies a characteristic auditory feature to produce a test spike pattern for the auditory signal; and comparing the test spike pattern to a plurality of predetermined spike patterns corresponding to a plurality of speech elements to determine whether the auditory signal includes one of the plurality of speech elements.

37 Claims, 11 Drawing Sheets

(51) Int. Cl.
*G10L 15/02* (2006.01)
*G10L 15/06* (2013.01)
*G10L 15/14* (2006.01)
*G10L 25/21* (2013.01)
*G10L 25/51* (2013.01)
*G10L 25/87* (2013.01)

(52) U.S. Cl.
CPC ............ *G10L 15/142* (2013.01); *G10L 25/21* (2013.01); *G10L 25/51* (2013.01); *G10L 25/87* (2013.01); *G10L 2015/027* (2013.01)

(56) References Cited

U.S. PATENT DOCUMENTS

| | | | | |
|---|---|---|---|---|
| 5,893,058 | A * | 4/1999 | Kosaka | G10L 15/12 704/236 |
| 6,151,592 | A * | 11/2000 | Inazumi | G10L 15/16 704/232 |
| 7,627,468 | B2 * | 12/2009 | Campbell | G10L 21/06 704/200 |
| 8,560,313 | B2 * | 10/2013 | Talwar | G10L 15/20 704/208 |
| 8,566,088 | B2 * | 10/2013 | Pinson | G10L 15/02 704/235 |
| 8,639,508 | B2 * | 1/2014 | Zhao | G10L 15/08 704/233 |
| 2002/0065633 | A1 * | 5/2002 | Levin | G10L 15/02 702/189 |
| 2003/0004712 | A1 | 1/2003 | Erell | |
| 2004/0172238 | A1 * | 9/2004 | Choo | G10L 15/04 704/202 |
| 2007/0005348 | A1 * | 1/2007 | Klefenz | A61B 5/04001 704/202 |
| 2008/0147391 | A1 * | 6/2008 | Jeong | G10L 15/02 704/232 |
| 2008/0167869 | A1 | 6/2008 | Nakadai et al. | |
| 2009/0204395 | A1 * | 8/2009 | Kato | G10L 13/033 704/206 |
| 2009/0287624 | A1 | 11/2009 | Rouat et al. | |
| 2010/0121638 | A1 * | 5/2010 | Pinson | G10L 15/02 704/235 |
| 2011/0035215 | A1 * | 2/2011 | Sompolinsky | G10L 15/02 704/231 |
| 2013/0304683 | A1 * | 11/2013 | Lo | G06N 3/06 706/20 |
| 2014/0200890 | A1 * | 7/2014 | Kurniawati | G10L 15/144 704/236 |
| 2015/0066499 | A1 * | 3/2015 | Wang | G10L 25/30 704/233 |

OTHER PUBLICATIONS

International Search Report and Written Opinion for Application No. PCT/US2014/060420 dated Jan. 23, 2015 (11 pages).

International Preliminary Report on Patentability for Application No. PCT/US2014/060420 dated Apr. 19, 2016 (10 pages).

Dufaux "Detection and recognition of impulsive sound signals", PhD thesis, Institute of Microtechnology, University of Neuchatel, Jan. 2001, p. 1-208.

* cited by examiner

SYSTEM AND METHOD FOR AUTOMATED SPEECH RECOGNITION

CROSS-REFERENCE TO RELATED APPLICATIONS

This application claims priority to U.S. Provisional Application No. 61/890,571, filed Oct. 14, 2013, the contents of which are incorporated herein by reference in their entirety.

STATEMENT REGARDING FEDERALLY-SPONSORED RESEARCH OR DEVELOPMENT

This invention was made with government support under Grant No. U.S. Pat. No. 1,116,530, awarded by the National Science Foundation. The Government has certain rights in the invention.

BACKGROUND

The present invention relates to automated speech recognition.

Speech recognition in noisy conditions is a major challenge for computer systems, yet is performed routinely and accurately by the human brain. Automatic speech recognition (ASR) systems that are inspired by neuroscience can potentially bridge the performance gap between humans and machines.

SUMMARY

Disclosed herein are systems and methods for noise-robust speech recognition which involve decoding sequences of spikes from a population of simulated auditory feature-detecting neurons. Each neuron is trained to selectively respond to a brief spectro-temporal pattern, or feature, drawn from a spectro-temporal representation of speech. The neural population conveys the time-dependent structure of a sound by its sequence of spikes. The spikes may either be decoded using a hidden Markov model-based recognizer, or using a template-based recognition scheme. In the latter case, words are recognized by comparing unknown spike sequences to template sequences obtained from clean training data, using a similarity measure based on the length of the longest common subsequence. The systems and methods may be applied to recognize isolated words, or to recognize continuous speech containing multiple words. When applied to a spoken digits task using the AURORA-2 database, the combined system outperforms a state-of-the-art robust speech recognizer at low signal-to-noise levels. Both the spike-based encoding scheme and the template-based decoding offer gains in noise robustness over traditional speech recognition methods.

In one embodiment, the invention provides a method of recognizing speech. The method includes the steps of obtaining an auditory signal; processing the auditory signal into a plurality of frequency components; processing the plurality of frequency components using a plurality of feature detectors, each feature detector producing a feature detector response; generating a spike for each instance in which a feature detector response identifies a characteristic auditory feature to produce a test spike pattern for the auditory signal; and comparing the test spike pattern to a plurality of predetermined spike patterns corresponding to a plurality of speech elements to determine whether the auditory signal includes one of the plurality of speech elements.

In another embodiment the invention provides a system for recognizing speech including an acquisition module to obtain an auditory signal and a controller in operative communication with the acquisition module. The controller is configured to obtain an auditory signal from the acquisition module, process the auditory signal into a plurality of frequency components, process the plurality of frequency components using a plurality of feature detectors, each feature detector producing a feature detector response, generate a spike for each instance in which a feature detector response identifies a characteristic auditory feature to produce a test spike pattern for the auditory signal, and compare the test spike pattern to a plurality of predetermined spike patterns corresponding to a plurality of speech elements to determine whether the auditory signal includes one of the plurality of speech elements.

In another embodiment the invention provides a method of recognizing speech. The method includes the steps of obtaining an auditory signal including a plurality of syllables of speech; identifying a syllable within the auditory signal, the syllable including a portion of the auditory signal; processing the syllable into a plurality of frequency components; processing the plurality of frequency components using a plurality of feature detectors, each feature detector producing a feature detector response; generating a spike for each instance in which a feature detector response identifies a characteristic auditory feature to produce a test spike pattern for the auditory signal; and comparing the test spike pattern to a plurality of predetermined spike patterns corresponding to a plurality of speech elements to determine whether the syllable corresponds to one of the plurality of speech elements.

Other aspects of the invention will become apparent by consideration of the detailed description and accompanying drawings.

BRIEF DESCRIPTION OF THE DRAWINGS

FIG. 1A shows a word (spectrogram shown at top) which is represented by the spikes of a population of feature-detecting neurons (center, labeled a-e), each of which is selectively tuned to a spectro-temporal speech feature. The spike code is translated into a sequence of neuron labels (bottom). FIG. 1B shows that, with noise, the code is corrupted by spike insertions and deletions (top, labeled a-e), but that a subset of spikes maintains its sequence from clean conditions (gray boxes). The invariant subsequence is identified by computing the longest common subsequence between the testing sequence and a template sequence stored from training data (arrows, bottom). Only five neurons are shown for illustrative purposes.

FIG. 11A shows a comparison of mean recognition rates for the conditions shown in FIGS. 8 and 10. Both the spike sequence coding and template-based decoding contribute increased noise robustness to the system. FIG. 11B shows a comparison with two benchmark systems. The presently-disclosed methods and systems give improved noise robustness at high noise levels.

DETAILED DESCRIPTION

Figure 1:
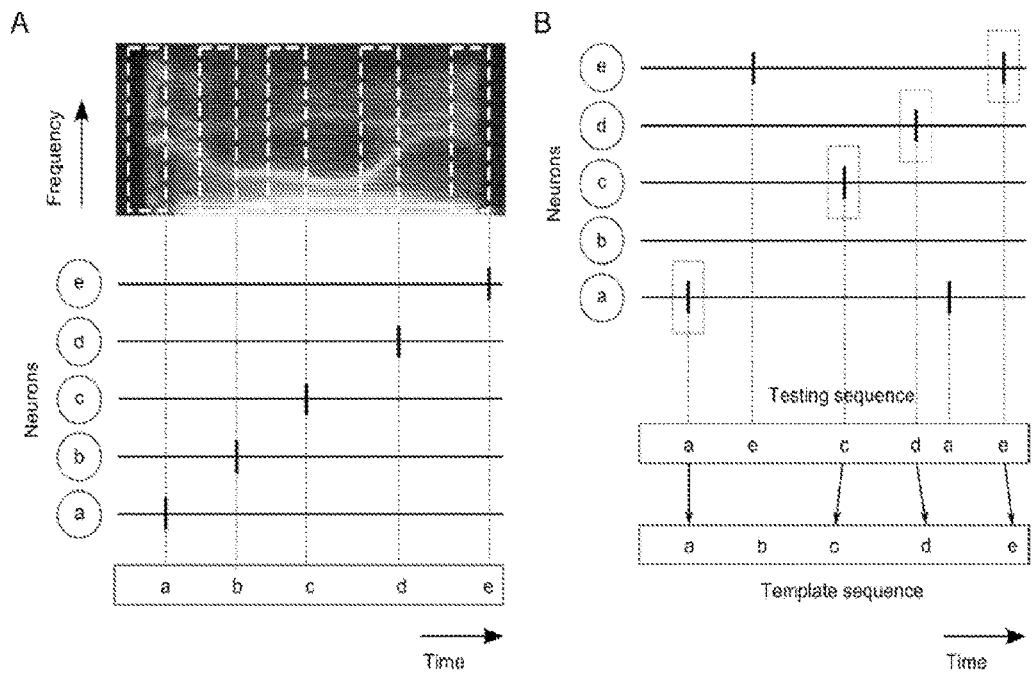
FIGS. 1A and 1B show aspects of the presently-disclosed methods and systems.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Despite significant advances in automatic speech recognition (ASR) over the past several decades, humans still outperform the best artificial systems on recognition tasks in noisy background conditions. A growing body of ASR research seeks to match human performance by emulating the speech processing performed by the brain. Biologically-inspired ASR systems can improve on traditional methods both by finding advantageous neuronal representations for sound and by developing new decoding paradigms to exploit them.

Experimental neuroscience has recently produced significant insights into auditory coding that can inform ASR development. Converging evidence shows that precisely-timed and reproducible spike responses carry information in the inferior colliculus and auditory cortex, forming representations known as spike-timing codes. Such codes may be specially implicated in processing natural stimuli such as animal vocalizations and speech, and may have a role in separating such signals from noise. Little is known, however, about how these spike representations can be used to perform robust pattern recognition.

Disclosed herein is an approach to ASR that pairs spike-based speech encoding with a robust, template-based decoding scheme. Design of the approach is based on the observation that a major source of performance loss in noise for traditional ASR systems is that they model the statistics of speech using hidden Markov models (HMMs) but use acoustic representations whose statistics are strongly influenced by the acoustic environment. The present approach therefore aims to 1) produce spike representations of speech that are relatively invariant under additive noise, and 2) decode the speech using a scheme that deals naturally with arbitrary corruptions of the spike code that do occur in noise.

The disclosed encoding scheme is based on a model of acoustic feature detection in the auditory cortex. Cortical neurons in several species have been shown to respond preferentially to behaviorally-relevant natural stimuli such as conspecific vocalizations and such selectively tuned neurons can produce responses that are insensitive to background noise. Thus, artificial neurons trained to selectively respond to specific speech features can generate robust spike codes by effectively "ignoring" signals that do not resemble their preferred stimuli. That is, in contrast with more traditional acoustic representations in which noise is faithfully conveyed along with speech, the artificial feature-detecting neurons generally represent (respond to) only those elements of a sound that resemble speech in clean conditions.

To implement this idea, each of a population of artificial neurons ("feature detectors") was trained to identify a brief, randomly-selected spectro-temporal pattern ("feature") in a simulated auditory nerve response to speech. The spikes of the feature detectors thereby represent speech in terms of the appearance of the detected features a given segment of speech contains as a function of time (FIG. 1A). The presently-disclosed methods and systems disregard the length of the time intervals between spikes and instead treat the resulting code as a sequence of neuron labels, that is, its "spike sequence." Accordingly, the presently-disclosed systems and methods are robust to temporal warping of the spike code, which poses a major problem for certain known systems.

Use of a spike sequence code offers improved noise robustness over known perceptual linear prediction (PLP) coefficients when used with an HMM decoder. In addition, further performance gains are obtained using a template-recognition scheme in which unknown spike sequences are compared to sequence templates obtained from training data. This method was inspired by the observation that in noise, although the spike code is corrupted by the addition and deletion of spikes, a subset of spikes often maintains a sequence similar to that seen in clean conditions. This invariant subsequence is also typically similar to some subsequence within the templates computed for the same word (FIG. 1B). In one embodiment, the best subsequence match between the test sequence and template is computed by finding the longest common subsequence (LCS) between them. The length of the LCS can be used to formulate a similarity measure for the spike sequences so that unknown words could be recognized by finding their best matches with the templates.

The performance of the methods and systems was tested on isolated words from the AURORA-2 noisy digits database (Hirsch and Pearce, 2000) and improved recognition results were found at low signal-to-noise ratios (SNRs) when compared with a state-of-the-art HMM-based system with missing data imputation (Gemmeke and Cranen, 2008). This robust performance was attributable both to the noise-invariance of the spike sequence code and to the noise-tolerance of the template-based decoding method. Significantly, unlike in many statistical ASR approaches, these results were achieved with a training scheme that used only clean speech without any noise modeling or multi-condition training; in some embodiments clean speech may be defined as speech recorded in a quiet environment (e.g. in a recording studio) and/or having a signal-to-noise ratio of no less than 20 dB.

Encoding Scheme and Feature Detector Training

Figure 2:
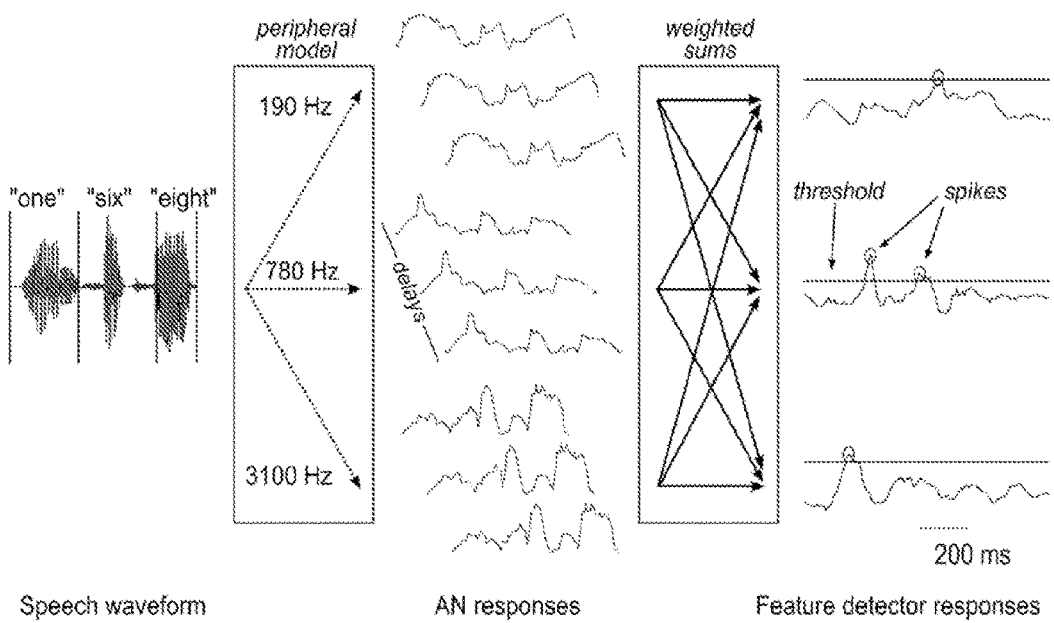
FIG. 2 shows a schematic of aspects of the presently-disclosed methods and systems. The displayed traces are obtained from actual experimental data. The acoustic waveform for several digits (left) is transformed into simulated AN firing rates (center, 3 of 32 frequency channels shown). Several time-delayed copies of the AN response are input to the feature detectors, which take a weighted sum over their inputs (right, 3 of 1100 feature detectors shown). Spikes (in which the peaks are circled) are assigned at peaks in the response that surpass a fixed threshold (horizontal gray lines).

The presently-disclosed speech encoding scheme includes a two-stage model of acoustic processing in the auditory system (FIG. 2). In the first stage, a simulation of the auditory periphery transforms an acoustic input into a set of firing rates on the auditory nerve (AN). In the second stage, feature detector neurons integrate the AN response over short time intervals to produce spike responses indicating the presence of specific spectro-temporal features. This section describes this encoding scheme and defines the method for discriminatively training the feature detectors.

The experiments were carried out using speech recordings from the AURORA-2 database. AURORA-2 consists of connected digits ("zero" through "nine", plus "oh") from the TIDIGITS multiple-speaker database (Leonard, 1984) in clean and a variety of additive noise conditions. The training and testing utterances are spoken by distinct sets of speakers. To obtain isolated digit samples, the speech was segmented using HMM-based forced alignment (Yuan and Liberman, 2008). In the case of noisy speech, alignments were found for clean speech and then applied to the corresponding noise mixes.

The function of the peripheral model is to filter sounds into frequency components, which are conveyed as simulated AN firing rates to the feature detectors. For the results presented here, a peripheral model based on a gammatone filterbank was used, although in other embodiments the frequency components may be obtained using a spectrogram method by taking the short-time Fourier transform or using other auditory filterbank methods. Other methods that simulate the response of the auditory periphery could also used. Here the filterbank includes 32 gammatone filters with center frequencies ranging from 100-4000 Hz on an equivalent rectangular bandwidth scale, although other scalings could also be used. In other embodiments, between 10-60 filters may be used with center frequencies which may range from 10 Hz to 20 kHz, although the upper and lower frequency limits and number of filters will depend on the type of data being analyzed. In various embodiments, to simulate hair cell transduction and the loss of phase locking in the ascending auditory pathway, the filtered signals are half-wave rectified, smoothed and resampled at 8 ms intervals, and square-root compressed. In various embodiments, the data may be sampled or resampled at a variety of time intervals, including intervals between 1 ms and 50 ms. Adaptation processes that lead to relative level-invariance at the level of cortex are here accounted for by normalizing each channel to unit variance for each speech sample, while in other embodiments other adaptive mechanisms could be used.

One aspect of the disclosed invention is a model of feature detection in the central auditory system. Feature detector neurons are trained to identify brief patterns in the AN signal across both the temporal and spatial (frequency) dimensions. This approach can be compared with physiological findings in which a neuron's ability to integrate over time and frequency is often described by a spectro-temporal receptive field (STRF). Here, temporal integration is implemented by including several time-delayed copies of the AN response as the input to each feature detector (FIG. 2, center). Eight time-delayed copies (8 ms apart) are included in a 256-dimensional input signal s(t), which gives the feature detectors a 64-ms "moving window" view of the sound. This window size was chosen to be long enough for the feature detectors to identify temporal structures such as up and down frequency sweeps, onsets, and offsets, but short enough that they responded only to mono- or bi-phonetic features that are relatively invariant under longer-scale temporal warping. In various embodiments, other numbers of time-delayed copies of the AN response corresponding to window sizes of 20-200 ms may be included in the input signal s(t).

Each feature detector is modeled as an artificial neuron that takes a weighted sum $\sigma(t)=w \cdot s(t)$ of its inputs and spikes at peaks in $\sigma(t)$ that exceed a fixed threshold (FIG. 2, right). The weights w are trained for each neuron to maximize its discriminative ability, as described below. In addition, the threshold levels are also determined separately for each neuron during training to maximize discriminative ability, as is also described below. Relative to the use of an STRF model, the assignment of spikes to peaks in the above-threshold summation signal introduces an additional non-linearity that is not captured by an STRF. In other embodiments of the invention, the threshold could be made to vary based upon the variance or other activity level of the signal $\sigma(t)$ over a past history of 1-60 seconds. In still other embodiments, a biological neuron model (e.g. a Hodgkin-Huxley model or integrate-and-fire model with fixed or varying threshold) could be used. In this latter case, the weighted sum could be treated as the input current to the neuron/feature detector, which would then fire according to its own internal dynamics.

The response properties of the feature detectors are set by training the weights w as follows. For each feature detector, a single clean digit exemplar, known as the "positive training exemplar," is selected and its AN response is computed with added delays $s^+(t)$. From the single clean digit exemplar, in various embodiments the response $s^+(t_0)$ at a single time point is randomly selected to serve as the preferred feature for the neuron. In other embodiments other methods of selecting preferred features may be used, for example features may be systematically selected at regular time intervals of a spoken word. In various embodiments, a single time point may correspond to an audio segment of between 5-200 ms, between 10-100 ms, or between 20-80 ms, or about 30 ms, about 40 ms, about 50 ms, about 60 ms, or about 70 ms. In one particular embodiment a single time point may be 64 ms, which includes the amount of time corresponding to the 'moving window' created by including multiple time-delayed copies of the AN in the input signal, as discussed above. Also, a set of background training data $s^-(t)$ consisting of concatenated, word-length responses to five exemplars of each of the other digits, called "negative training exemplars," are selected, although fewer or greater numbers of exemplars can be used as negative training exemplars. For instance, if the preferred feature is selected from within an exemplar of "two," the background data consists of concatenated exemplars of each of the digits "one," "three," "four," etc. Note that while the full time-varying responses of the negative exemplars are used in the training, only a single, randomly selected time point $t_0$ within the positive training exemplar is used.

A goal in the training is to find a weight vector w such that the neuron spikes in response to the preferred feature but not in response to the background. This is accomplished using a linear support vector machine (SVM) (Vapnik, 1998). Formally, the SVM finds a weight vector w and bias b such that $w \cdot s^+(t_0) = b+1$ and $w \cdot s^-(t) < b-1$ for all t, with the margin of separation $\|w\|^2$ as large as possible. The value $b-1$ is interpreted as the unit's threshold, so that the response to the preferred feature is as far above threshold as possible while still keeping the background responses below. In various embodiments, the weights may be trained using other discriminative training schemes such as linear discriminant analysis or back-propagation. In further embodiments, the weights may be trained with unsupervised training using independent component analysis. In the unsupervised case, the data is not divided into positive and negative classes. Rather, a large body of speech input is input to the algorithm and a training rule is applied to optimize the sparseness of the feature detector responses. Finally, while in the embodiments disclosed herein the weights have been trained using only clean speech, in some embodiments the weights may be trained using noisy speech, which is called multicondition training. The noisy speech can be used in the positive and/or negative training classes to improve the noise robustness of the feature detector responses.

Figure 3:
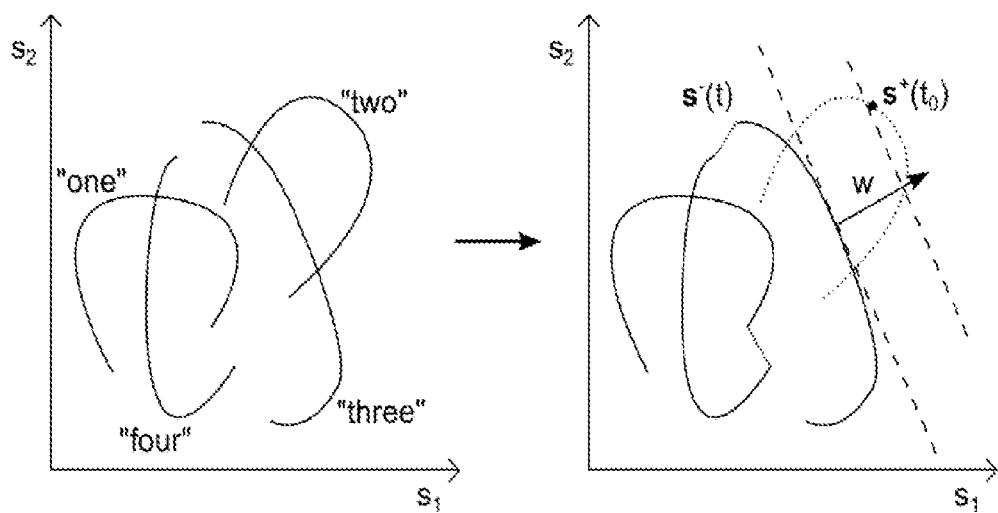
FIG. 3 shows a schematic of linear support vector machine (SVM) training of the weight vector w for a single feature detector. At left, the AN responses to several words are visualized as trajectories in a 256-dimensional space. At right, a single point $s^+(t_0)$ in the trajectory for the word "two" is selected as the preferred feature; the remainder of the word (gray curve) is not used in the training. Other words are concatenated to form the background trajectory $s^-(t)$. The surfaces $w \cdot s = b+1$ and $w \cdot s = b-1$ (dotted lines) define a margin separating the two training classes. The objective for SVM training is to maximize the size of this margin.

Intuitively, $s^+(t_0)$ can be visualized as a single point along the trajectory $s^+(t)$ taken by the positive training exemplar through the space of feature detector inputs (FIG. 3). The trajectories defined by the negative training exemplars are combined to form a single trajectory $s^-(t)$ through the space. After training, the weight vector defines a hyperplane that maximally separates the preferred feature from the background.

Figure 4:
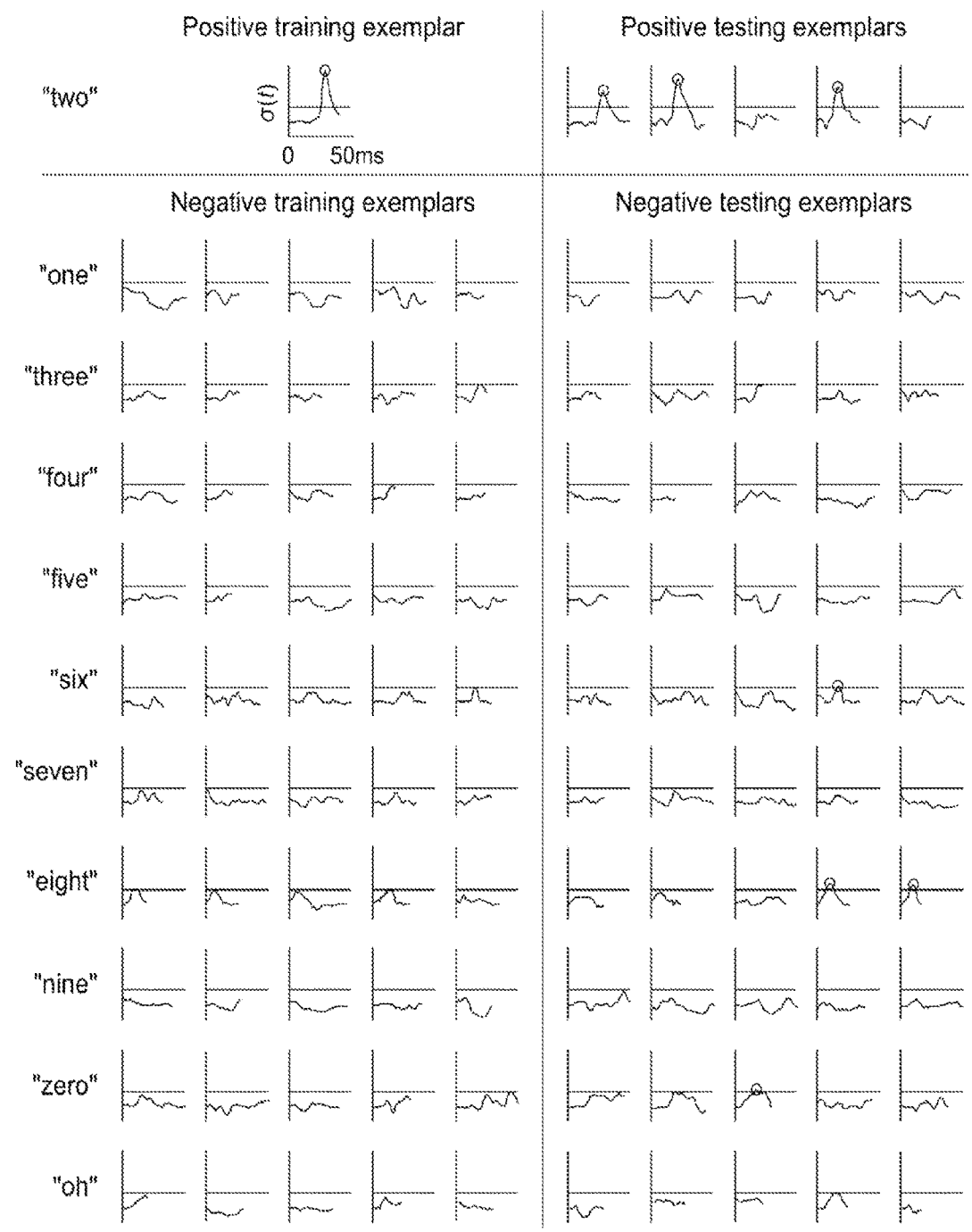
FIG. 4 shows SVM training results for a single feature detector. Each plot shows the summation response $\sigma(t)$ of the neuron (arbitrary units) versus time for a single word. Gray horizontal lines show the neuron's threshold; circles indicate the location of spikes. Top left, the response to the positive training exemplar of the word "two," with a peak at the time of selected preferred feature. Top right, the responses to five testing exemplars of the word "two." Bottom left, responses to the five negative training exemplars of each digit. Bottom right, responses to negative testing exemplars. Horizontal and vertical scales are the same for all plots.

FIG. 4 shows the result of SVM training for a single feature detector. At upper left is the word-length summation response $\sigma(t)$ to the positive training exemplar, i.e. the word "two," from which the preferred feature was selected. The response has an above-threshold peak at the time of the preferred feature $t_0$, so the neuron produces a spike and successfully detects the feature. Shown at lower left are the responses to the negative training exemplars that include the background. By design, these responses all have peaks below the threshold and therefore do not produce spikes.

To demonstrate the feature detector's ability to generalize to data not present in the SVM training, FIG. 4 also shows responses to randomly selected independent testing exemplars of each digit. Exemplars of "two" are termed "positive testing exemplars." Because of variations in pronunciation, it is expected that features similar to $s^+(t_0)$ will be detected only in some of these exemplars. Indeed, only three of the five exemplars shown produce spikes, which are referred to as hits. Exemplars of other digits are termed "negative testing exemplars." Because the digits are mostly phonetically distinct, it is expected that few features that are similar to $s^+(t_0)$ among these exemplars will be detected. Most of the negative testing exemplars accordingly have subthreshold responses, but a few do produce spikes, which are referred to as false hits. In other embodiments of the invention, the above discriminative training procedure could be implemented but with another learning paradigm used in place of SVM. For example, linear discriminant analysis could be used. Alternatively, an unsupervised algorithm such as independent component analysis can be used to identify both a set of preferred features and accompanying weights optimized to produce sparse responses. The thresholds in these cases would need to be assigned in order to optimize the hit rates/false hit rates described below.

Thus, by repeating the training procedure with different preferred features and background sets, a population of feature detectors is created which is sensitive to a broad range of speech features. One preferred feature was randomly selected from an exemplar of each of the eleven digits spoken by each of 50 male and 50 female speakers in the AURORA-2 training set, for a total of 1100 features. Different background exemplars were selected for the SVM training with each preferred feature. In various embodiments, the number of feature detectors and templates (see below) that are used can be varied. In general, performance is improved by the inclusion of more detectors and templates, although with diminishing returns. The number of feature detectors can be increased until the performance of the system begins to plateau. In this way the computational efficiency and performance level can be balanced. To expand the system to larger vocabularies, additional feature detectors are trained to identify the additional speech features, while additional templates are used in the decoding. In various embodiments, the number of templates used for recognition of each word in the vocabulary is at least 1, at least 5, at least 10, at least 20, at least 50, at least 100, or at least 200. As discussed further below, a separate template may be generated for each spoken exemplar of a word, where each exemplar may correspond to a different speaker. The numbers of feature detectors and templates may be increased in proportion to the size of the vocabulary, with consideration of trade-offs between performance and efficiency as described above. In embodiments of the invention, the vocabulary is at least 5 words, at least 10 words, at least 20 words, at least 50 words, at least 100 words, or at least 200 words, with suitable numbers of templates. The number of feature detectors in various embodiments is at least 100, at least 200, at least 500, at least 750, at least 1000, at least 1100, at least 1500, at least 2000, at least 5000, or at least 10000.

Figure 5:
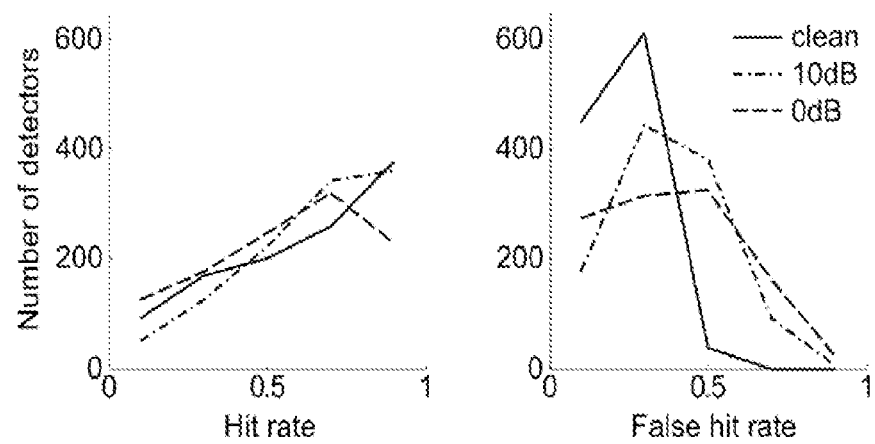
FIG. 5 shows histograms of hit rates and false hit rates for the feature detectors in clean conditions and in mixes with subway noise at 10 dB and 0 dB SNR. The hit rate/false hit rate is expressed as the fraction of positive/negative testing exemplars for each detector that produces a spike.

As discussed above, because of pronunciation variations it is not expected that one could detect precisely the same feature set in every exemplar of a given digit. Nevertheless, hit rates and false hit rates over the testing data provide a useful comparison of each feature detector's performance on testing data. These rates are defined as the number of positive or negative testing exemplars during which a detector produced a hit or false hit, respectively. Histograms of these rates for the feature detector population are shown in FIG. 5.

Robustness of Spike Sequence Code

In designing the encoding scheme, it was hypothesized that selective tuning of the feature detectors could yield spike codes that are robust to additive acoustic noise. This claim was evaluated using speech from Test Set A of the AURORA-2 database. The test data includes mixes with babble, car, subway, and exhibition hall noise at SNRs of 20 dB through −5 dB.

Figure 6:
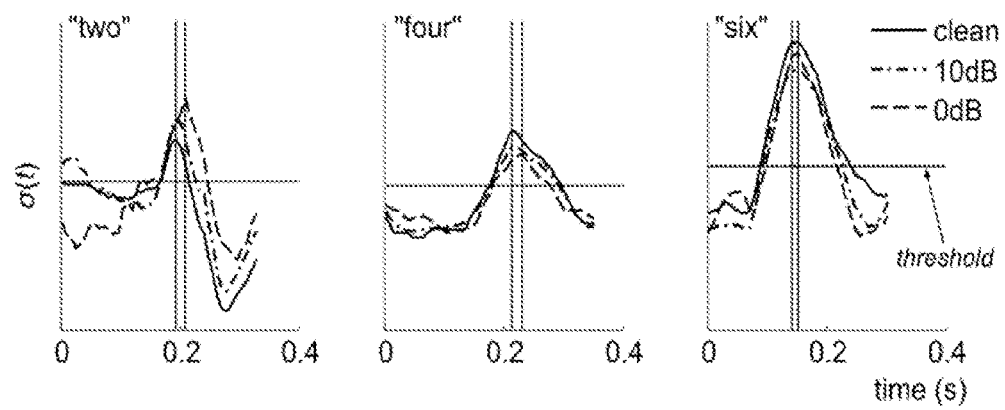
FIG. 6 shows responses of three different feature detectors to three word-length speech stimuli (one exemplar of the words "two," "four," and "six," respectively) in clean conditions and in mixes with subway noise at 10 dB and 0 dB SNR. Vertical lines show the change in spike timing (i.e. the change in response peak location) between clean conditions and 0 dB. Horizontal lines show the threshold for each neuron.

To give an intuition for why the feature detector training yields a robust code, FIG. 6 shows the summation responses σ(t) for three different feature detectors in clean conditions and in mixes with subway noise at 10 dB and 0 dB. The noise affects the shape of the responses, but due to the large margin afforded by the SVM training, all of the response peaks shown in FIG. 6 remain above threshold. Furthermore, the timing of the feature detector spikes, which is determined by the positions of the response peaks, is shifted only slightly by the noise.

Figure 7:
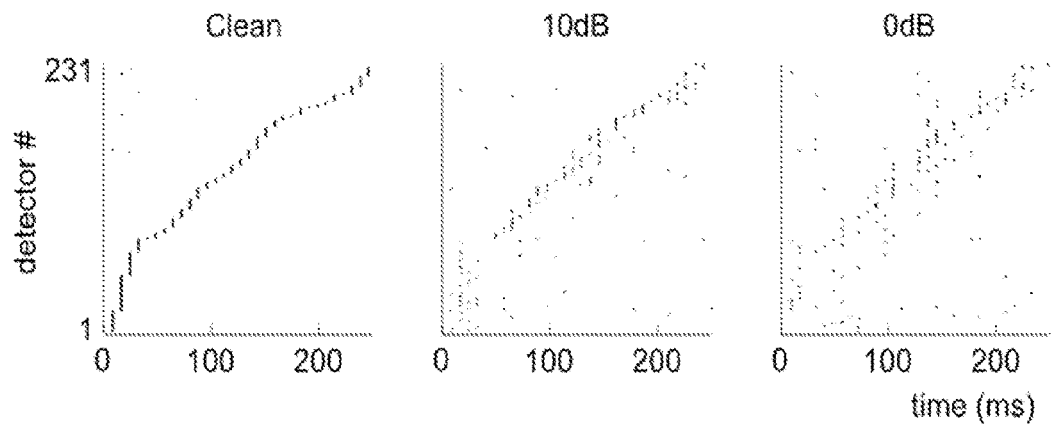
FIG. 7 shows spike code degradation in noise. Raster plots of feature detector spikes are shown for a single exemplar of the word "five" in clean conditions and in mixes with subway noise at 10 dB and 0 dB SNR. The feature detectors are ordered by their spike response to this exemplar in clean conditions. Only the 231 feature detectors that spike in clean conditions for this word are graphed.

FIG. 7 displays the effects of the subway noise at the level of the population spike code for a single word. Despite some jitter in the spike timing and some extraneous spiking compared to clean conditions, a subset of well-ordered spikes is still visible at 0 dB. The effect of subway noise on the feature detector population as a whole can also be seen in the hit rate and false hit rate histograms in FIG. 5. As the noise level increases, there is an increase in the number of false hits for some feature detectors but only a modest decrease in the hit rate.

To test the feature detector code's robustness in the context of a speech recognition task, a comparison was performed with a set of baseline frame-based features using an HMM decoder. The baseline features consisted of 39 PLP coefficients (13 cepstral coefficients plus delta and acceleration) computed at 25 ms intervals. As described above, with the feature detector code only the sequential ordering of the spikes and not their precise timing was considered. That is, the spike code was converted to a sequence of discrete neuron labels ordered by their spike times (see FIGS. 1A, 1B). Note that the assignment of neuron labels to neurons is arbitrary. In cases where multiple spikes occurred at the same 8-ms peripheral model time step, the corresponding neuron labels at that time step were placed in ascending order.

For each encoding, whole-word, left-to-right HMMs with 16 states and no state skipping were trained by Baum-Welch re-estimation using the Hidden Markov Toolkit (HTK). Since isolated word samples were used, no silence model was needed. For the PLP system, the state emission probabilities were modeled as a single Gaussian mixture with diagonal covariance. For the spike sequence code, discrete emission probabilities were modeled.

Figure 8:
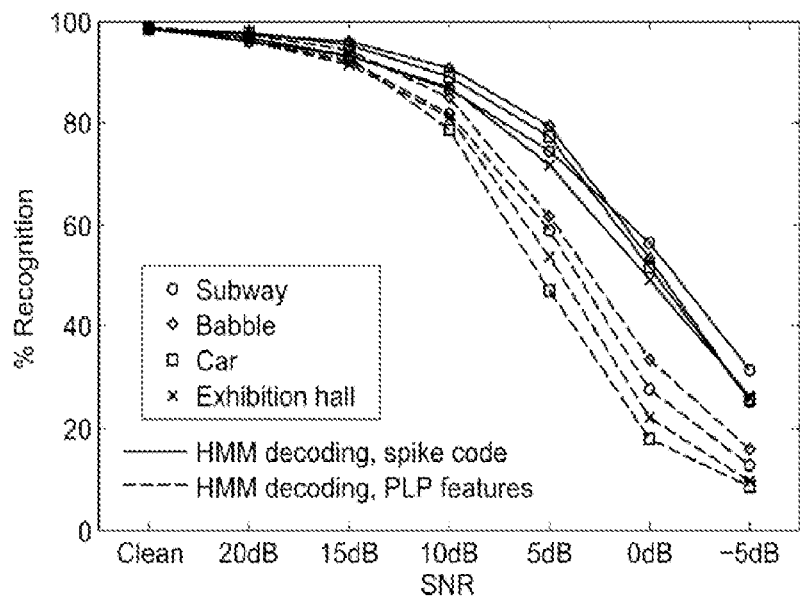
FIG. 8 shows that the spike sequence code gives improved recognition results over perceptual linear prediction (PLP) coefficients when used with a Hidden Markov Model (HMM) decoder. Recognition rates are shown for the four noise types in AURORA-2 test set A.

Recognition results for the two encoding schemes were obtained using the HTK tool HVite and are shown in FIG. 8. Average recognition rates at each noise level can also be seen in the summary results in FIG. 10. The spike sequence code gives superior recognition results across all noise levels.

Template-Based Recognition Scheme and Recognition Results

While the feature detector code offered improved noise robustness when used with a HMM decoder, further performance gains were obtained using an alternative, template-based decoding scheme. As noted previously, a major weakness of HMM decoding is that HMMs cannot readily adapt to changes in speech statistics in unfamiliar noise conditions. In template-based recognition, by contrast, unknown speech is identified by direct comparison to pre-labeled speech templates, thus avoiding any statistical modeling of data. A template-based scheme was devised in which noisy speech was compared to clean training utterances using a novel speech similarity measure based on the LCS length between spike sequences. Given two sequences of symbols $X=\{x1, \ldots, xM\}$ and $Y=\{y1, \ldots, yN\}$, the LCS is defined as the longest sequence $Z=\{z1, \ldots, zK\}$ that can be composed by drawing elements in left to right order, but not necessarily contiguously, from either X or Y. For instance, in the example shown in FIG. 1B, the sequences {a, b, c, d, e} and {a, e, c, d, a, e} have a LCS {a, c, d, e}, with a LCS length of 4. The LCS length can be efficiently computed by the known algorithm from dynamic programming (Bergroth et al., 2000). In various embodiments, a sound sample (which may contain multiple words) can be processed and analyzed using the procedures disclosed herein, including the LCS method to identify a best-matching template, with or without first segmenting the sample into separate words.

The motivation for using the LCS length was illustrated in FIGS. 1A and 1B. Although noise corrupts the spike code for a test word, it was observed that a subset of spikes often occurs in the same sequence as in clean conditions (see also FIG. 7). Indeed, as seen in FIG. 5, noise typically leads to an increase in the false hit rate but minimally affects the (positive) hit rate, so that many of the spikes present in clean conditions persist in noise. The LCS length therefore quantifies the best subsequence match between the test sequence and a template without requiring a detailed model of the noise's effect on the code.

Figure 9:
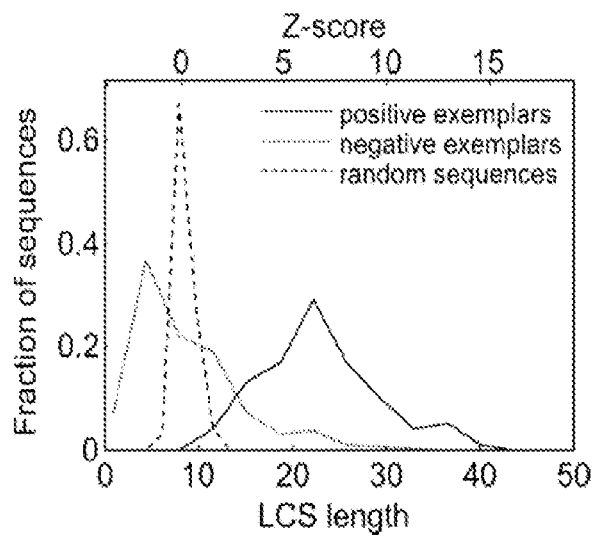
FIG. 9 shows longest common subsequence (LCS) length distribution for a single sequence template derived from an exemplar of the word "one". The solid curves show the distribution of LCS lengths with respect to testing exemplars of "one" (positive exemplars) and testing exemplars of other digits (negative exemplars). The dotted curve shows the distribution of LCS lengths with respect to a set of 100 randomly-generated sequences of equal length (see text). The mean and standard deviation of this random distribution are used to convert the LCS lengths of the testing data (lower axis) into Z-scores (upper axis) that were used as a similarity measure for template-based recognition.

In some embodiments, the raw LCS length alone did not constitute a good sequence similarity measure because some of the templates had longer average LCS lengths with the testing sequences than others. This was due in part to the varied lengths of the template sequences, and led to a bias toward recognition by some templates. Only a fraction of the 1100 feature detectors may recognize a given word; for example, in one particular implementation 231 feature detectors spike for the word "five." To normalize out the differences between templates, a distribution of "expected" LCS lengths was computed for each template using randomly-generated spike sequences. For a given template, 100 spike sequences of the same length were generated, with each spike randomly assigned to a feature detector with probabilities proportional to the average feature detector firing rates on training data sets. The LCS of these randomly-generated sequences with the template were used to fill out the distribution of LCS lengths. The LCS length of a test sequence with the template as a Z-score was expressed with respect to this distribution (FIG. 9). The Z-score is defined as the number of standard deviations separating a value from the mean of a distribution. This process can be summarized with the similarity formula $$\text{sim}(S_{temp}, S_{test}) = Z_{temp}(|\text{LCS}(S_{temp}, S_{test})|)$$

where $|\cdot|$ denotes a sequence length and $Z_{temp}(\cdot)$ represents the transformation to a Z-score using the template's randomized distribution.

The recognition scheme worked as follows. A bank of sequence templates was created which included spike sequence responses to 100 exemplars of each digit, which were randomly selected from the clean speech of 50 male and 50 female speakers in the AURORA-2 training set. The templates were grouped into 22 sets $\{\Omega_k\}_{k=1}^{22}$ according to the 11 digits and 2 speaker genders. Because speaker gender is a major source of variability in the speech, grouping by gender produced template sets with more homogeneous composition than would grouping by digit alone. To recognize a test word, its spike sequence was first determined and its similarity score was computed relative to each of the templates. Then for each template set $\Omega_k$, its $N_k$ best matches with the test sequence were selected and their similarity scores were averaged to find a mean similarity score for the set. The set with the highest score was taken to identify the digit. In various embodiments, a minimum threshold level may be determined, such that if the similarity score is below this threshold then the system determines that no match has been made. The threshold could be set, for example, as a fixed percentage of the mean similarity score on testing data, or it could be set empirically by finding the best discriminating threshold between words and non-words on a validation data set. A failure to make a correct match may occur if a spoken word is not in the predetermined set of recognizable words or if the speech is otherwise unrecognizable (e.g. due to excessive noise or an unusual pronunciation).

To find an optimal set of values $\{N_k\}_{k=1}^{22}$, recognition rates were computed using a set of validation data including 500 exemplars of each digit, drawn from the AURORA-2 training set. The values that gave the best recognition rates on this validation data were then applied to all subsequent recognition trials with testing data. The recognition scheme was applied to the AURORA-2 test data and the results shown in FIG. 10 were obtained. Results superior to the HMM decoder were obtained at all noise levels.

Figure 10:
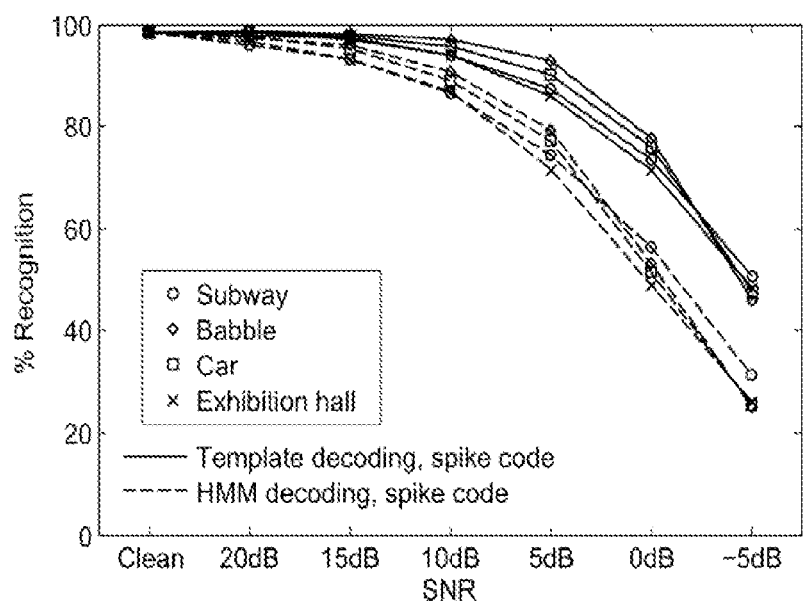
FIG. 10 shows that the template-based decoding scheme gives improved recognition results over an HMM decoder when used with the spike sequence code. Recognition rates are shown for the four noise types in AURORA-2 test set A. HMM results are duplicated from FIG. 8 for comparison.

By comparing the results in FIGS. 8 and 10, it can be seen that both the encoding and decoding schemes contribute to the gains in noise robustness using the presently-disclosed methods and systems. An additional question is to what extent the gammatone filterbank-based peripheral model contributes to the system's performance. To address this, an additional set of experiments were run using an alternative, spectrogram-based peripheral model. To obtain the spectrogram, the discrete Fourier transform of the sound waveform was computed in 9-ms Hamming windows spaced by 1 ms. For direct comparison with the gammatone filterbank method, the frequency axis was converted to an identical ERB frequency scale using triangular interpolation. In other experiments it was observed that this non-linear frequency scaling contributed to improved recognition performance in the presently-disclosed model. The absolute value of the response in each frequency channel was square root compressed, resampled, and normalized just as in the gammatone method. The remainder of the training and testing procedure was the same as before. The resulting recognition performance was nearly identical to that obtained using the gammatone filterbank, except for a slight decrease in the noise-averaged recognition rates at low SNRs (0.9% decrease at 0 dB, 3.1% at −5 dB). This small difference in performance may result from the gammatone filterbank's varied bandwidths, which permit better resolution of fine spectral patterns at low frequencies and sharp temporal modulations at high frequencies.

Figure 11:
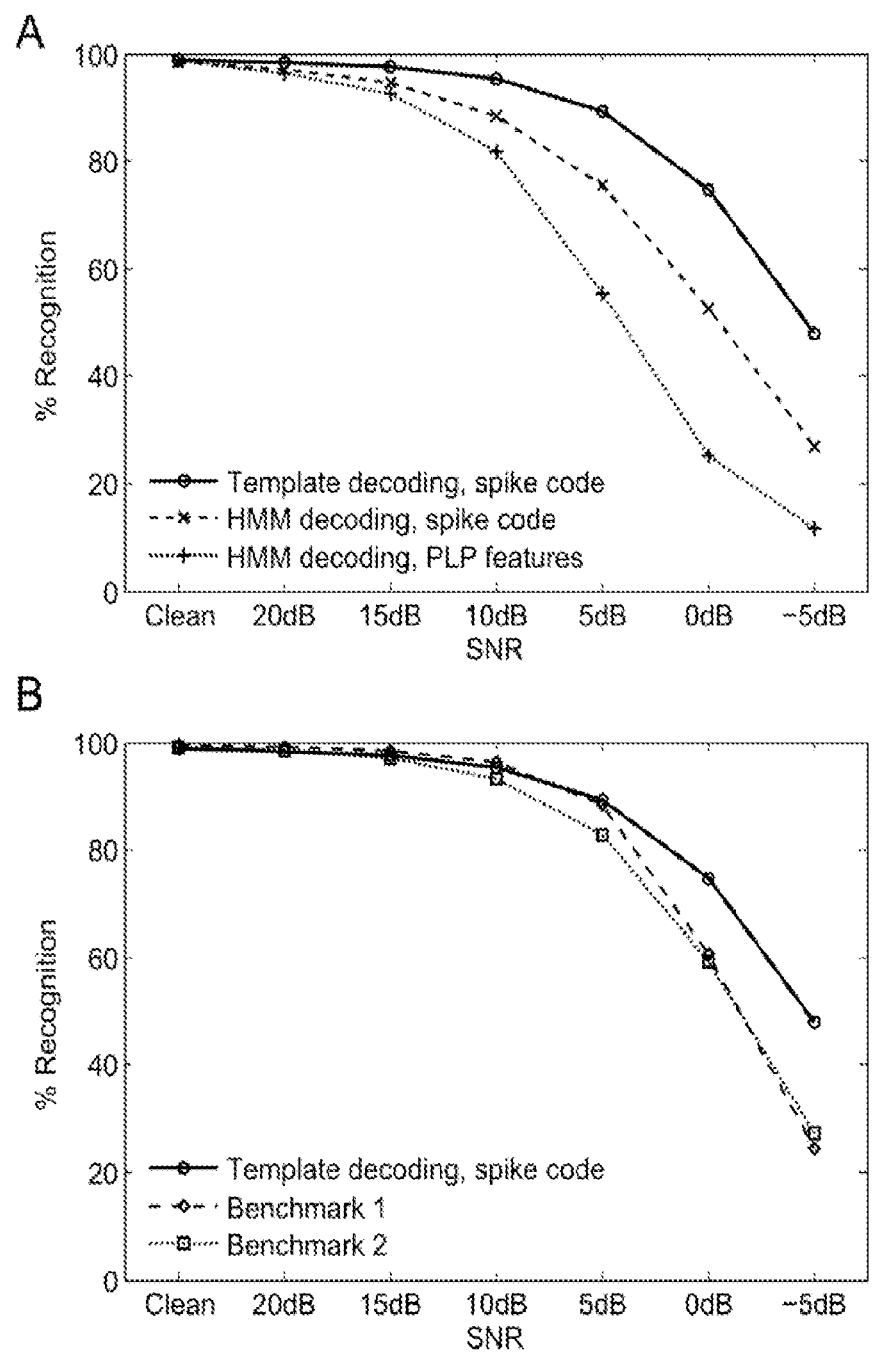
FIGS. 11A and 11B show a summary of speech recognition results. Recognition rates are shown averaged over the four noise conditions.

FIGS. 11A and 11B summarize the speech recognition results. In FIG. 11A, mean recognition rates are displayed for the cases shown previously in FIGS. 8 and 10. As demonstrated, both the spike sequence coding and the template-based decoding contribute to the system's robustness. In FIG. 11B the system's performance is compared to benchmark results for isolated words from the AURORA-2 data set published in Gemmeke and Cranen (2008). These benchmarks were obtained using state-of-the-art HMM-based recognizers with missing data imputation, in which noise-corrupted spectro-temporal regions in the sound are identified, removed, and filled in by inference from the remaining data. In these cases the imputation was performed either by maximum likelihood inference (benchmark 1) or through sparse decomposition of the remaining elements in a basis derived from clean data (benchmark 2). The model's performance is similar to the benchmarks in clean and low-noise conditions, but gives a significant increase in performance at 0 dB and −5 dB, with mean recognition rates of 74.7% and 48.1%, respectively.

Continuous Speech

The system may additionally be made to recognize continuous speech, in which utterances consisting of one or more words are presented to the recognizer rather than isolated words exclusively. A method is here presented which combines the previously described methods with a speech tempo regulator unit, which detects syllables and regulates the rate at which templates are aligned to speech. Once the continuous speech has been divided into syllables, the individual syllables are subjected to an analysis such as that described above to determine which word or sound each syllable corresponds to. With continuous speech, the context in which the syllables are spoken can help to identify the likeliest word or sound to which each syllable corresponds, for example based on the probability that certain syllables are likely to occur or not occur in succession.

Speech has a rhythm that assists in segmenting sounds into words and syllables. Speech rhythm is encoded in perceptual qualities such as stress, tone, and prosody and is one of the first cues used by infants to segment words of their native language. For adult listeners, the syllable is arguably the fundamental perceptual unit for speech rhythm. Syllable onsets are robustly perceived in noise and have relatively invariant acoustic properties, providing reliable features for recognition. However, ASR systems generally make no explicit reference to this important perceptual quality of speech.

Automated methods for syllable detection have a long history and have frequently been used to perform speech rate estimation. Typically these algorithms work by extracting a time-varying signal such as the acoustic energy, periodicity, or sub-band energy correlation, and subsequently locating peaks in the signal using various heuristics. However, these methods suffer from poor noise robustness because noise introduces spurious peaks to the signals. For example, one such method was applied to the AURORA-2 data and obtained 90% accurate detection of syllables in clean conditions but only 5% accurate detection in 0 dB babble noise. Accuracy is determined according to the formula (1−E/N)*100%, where E is the number of errors and N is the number of syllables. Errors were defined as false detections outside the bounds of a true syllable, extraneous detections within a syllable, or false negatives in which a syllable was not detected.

For the present syllabification approach, the acoustic energy is used, as calculated in 10 ms time bins from the sound. Other time dependent signals could also be used to identify syllables, such as the sound's autocorrelation (or those described in one or more of Mermelstein, 1975; Campbell, 1993; Pfitzinger et al., 1996; Morgan et al., 1997; Faltlhauser et al., 2000; Howitt, 2000; Xie and Niyogi, 2006; and Wang and Narayanan, 2007). To obtain superior syllabification performance in noise, however, one or more of the following signal conditioning (smoothing and normalization) steps may be applied in the present trials:

Compression: Perform square-root compression of the signal to reduce the effect of very large peaks on the syllabification.

Smoothing: Smooth the signal using a 2nd order Savitzky-Golay filter over a 15-point window. This eliminates much of the noise on the signal while preserving its basic structure much better than the moving-window average described above.

Normalization: Compute the mean and standard deviation from the signal over a moving Gaussian window with a width of 1.5 seconds. Then do a mean-variance normalization at each time point with respect to the computed values. This puts the signal into a common dynamic range while allowing for long-term fluctuations in the background noise level.

Thresholding: Find all peaks exceeding a threshold of zero. If two peaks occur within a 100 ms interval, only the higher peak is accepted.

False-peak elimination: Find the minima between each pair of peaks. If a minimum occurs within 20 ms preceding or following a peak, eliminate the peak. If a peak is higher than a neighboring minimum by less than 0.2 normalized units, eliminate the peak. This removes small peaks left over from smoothing. If two peaks occur within 100 ms of one another, eliminate the lower peak.

Fitting: Clean up the peak locations by fitting a Gaussian between each pair of minima.

Start/end pause priors: Eliminate any peaks that are within 250 ms of the beginning or end of the file.

Figure 12:
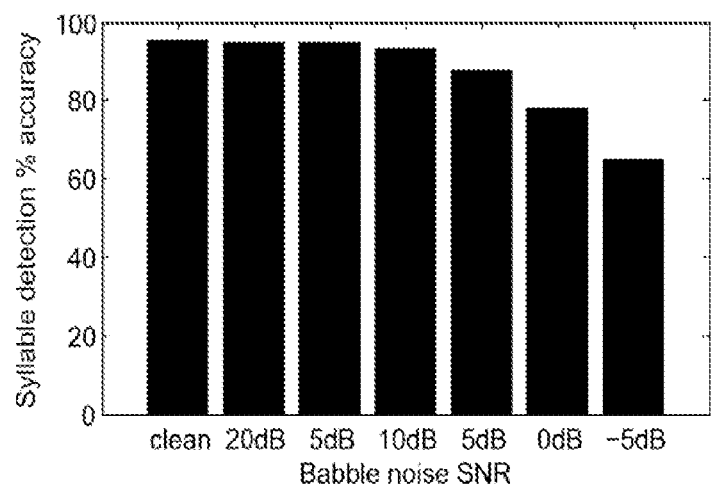
FIG. 12 shows the accuracy of syllable detection using the disclosed methods, in varying levels of babble noise.

As shown in FIG. 12, this method gives 95% detection of syllables in clean conditions, which is comparable to or better than the performance of other methods for syllable detection previously described. In noise, however, the performance degrades only to 93% in 10 dB babble noise and 78% in 0 dB babble noise, both of which are surprisingly good levels of performance.

Dividing continuous speech into individual syllables, referred to as syllabification, can be used to constrain the rate of word insertion in template-based recognition during usage situations in which it is known that more than a single word may be uttered at a time. In the case in which only a single syllable is detected, recognition can proceed as in the isolated word case. Otherwise, recognition can proceed in a continuous mode. Typically in template-based speech recognition, continuous speech is handled by allowing transitions from the end of one template to the beginning of all others. This approach can be applied to the present method, but a significant challenge arises. One of the strengths of the presently-disclosed LCS-based method for template matching is that is allows for spike insertions and deletions that occur due to noise. Additionally, it allows for arbitrary temporal warping of the template and/or test utterances. However, for continuous speech, these methods could potentially lead to insertion errors because many templates can be concatenated to match the spikes without any penalty.

Figure 13:
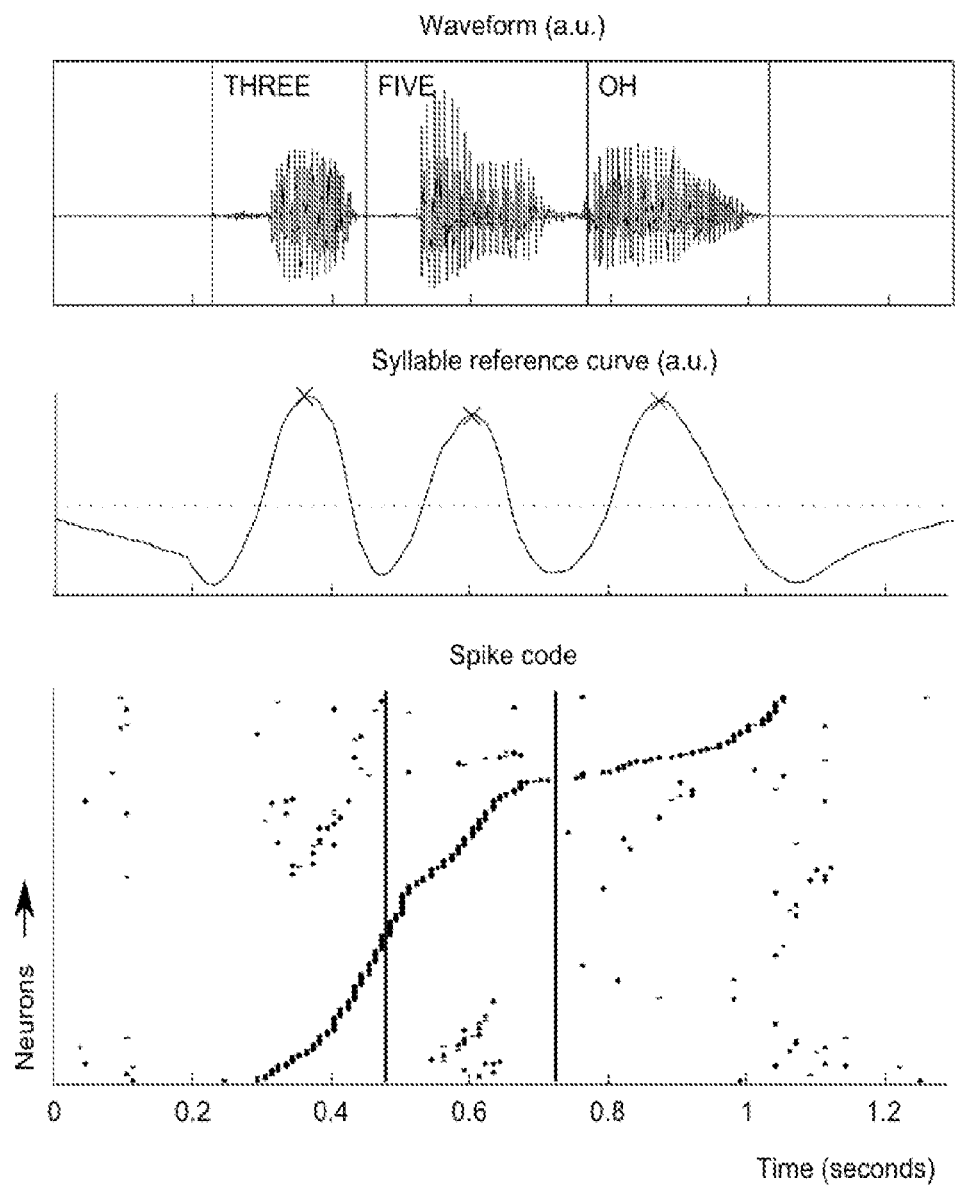
FIG. 13 illustrates the system's application to continuous speech. The acoustic waveform, top, is binned at 10 ms intervals and the energy is computed. The energy signal is smoothed to obtain the curve in the middle panel. Peaks are located on this signal (X's) and intervening minima are taken as the syllable boundaries. These boundaries are used to segment the spike sequence code (vertical bars, lower panel).

To address this problem, certain embodiments of the invention may use the minima of the smoothed energy curve described above to mark the boundaries between syllables and segment the speech. Of the spoken digits in the AURORA-2 dataset, all digits other than 'seven' and 'zero' are monosyllabic; following segmentation, these and other digits can be recognized using the isolated speech recognition methods as described above. FIG. 13 shows the described procedure in which the speech is segmented and then recognized in terms of the spike sequence. In the case of polysyllabic words, training data may be segmented into syllables to produce spike templates corresponding to the first and second syllables of each word. These sub-word units constitute additional vocabulary elements that may be recognized by the system. To prevent recognizing first- or second-syllable templates without their counterparts, a syntax is defined for syllable concatenation in which second-syllable templates must follow their corresponding first-syllable templates. The optimal concatenation of templates that obeys the syntax is found through a dynamic programming search.

Figure 14:
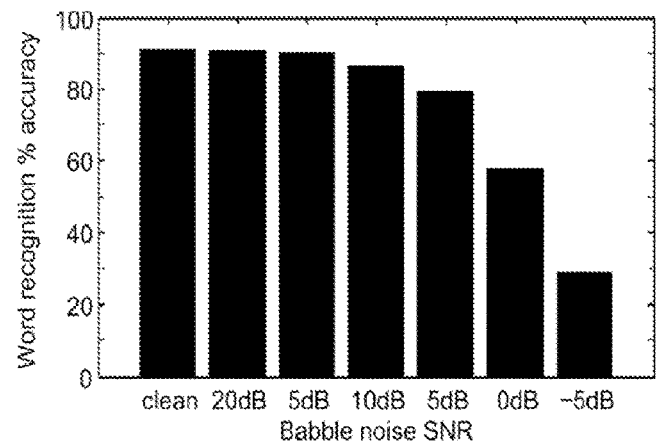
FIG. 14 shows recognition results for continuous speech in the AURORA-2 data, in varying levels of babble noise via the disclosed syllabification method.

As shown in FIG. 14, the described method gives 92% recognition of continuous clean speech on the AURORA-2 dataset. For continuous speech mixed with babble noise, the result is 84% at 10 dB SNR, and 55% at 0 dB SNR. Results for other SNR levels ranging from clean (no noise) to −5 dB are also shown.

In various embodiments, the above-described methods and systems can be used for automated speech recognition. In one particular embodiment, the methods and systems are used for automated speech recognition of a fixed set of vocal commands. While the systems and methods can be used in virtually any environment, they are particularly useful in noisy environments in which known systems are unable to reliably recognize speech. Such environments include, without limitation, vehicles such as automobiles, trucks, tractors, trains, ships, submarines, and aircraft; military applications such as troop, combat, or transport systems; industrial settings such as control rooms and factory floors; and public gathering places such as restaurants, bars, parties, sports events, concerts, emergency situations, and the like. The methods and systems can be implemented on a variety of systems such as those on smartphones or other portable or stationary phone units; desktop, laptop, and tablet computers; vehicle on-board computers; industrial control systems; cash registers or other point of sale devices; credit card authorization systems; ATMs; telephone voicemail or answering machines; telephone trees or other automated telephone answering or response systems (e.g. customer service or emergency response systems); and police, fire, medical, military, or other emergency response vehicles, equipment, or settings.

Figure 15:
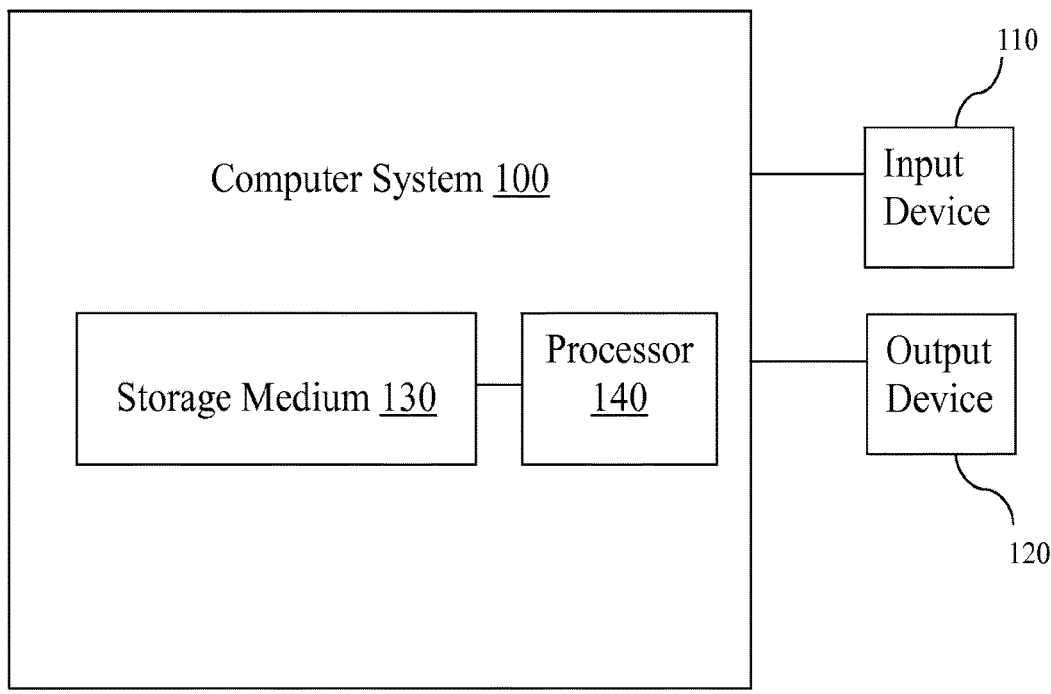
FIG. 15 shows a computer system which may be used for carrying out embodiments of the disclosed invention.

In various embodiments, the disclosed methods and systems may be implemented on one or more computer system 100 (FIG. 15). The computer system 100 may be part of an existing computer system (e.g. on a smartphone, desktop computer, on-board computer, etc.) or may be implemented as a separate unit that is in local or remote communication with other components. The computer systems 100 may be in wired or wireless communication with one another through a combination of local and global networks including the Internet. Each computer system 100 may include one or more input device 110, output device 120, storage medium 130, and processor (e.g. a microprocessor) 140. Input devices may include a microphone, a keyboard, a computer mouse, a touch pad, a touch screen, a digital tablet, a track ball, and the like. Output devices include a cathode-ray tube (CRT) computer monitor, a liquid-crystal display (LCD) or LED computer monitor, touch screen, speaker, and the like.

The computer system 100 may be organized into various modules including an acquisition module, an output module, and a controller, where the controller is in communication with the acquisition module and the output module. The various modules for acquiring and processing auditory signals and for returning a result may be implemented by a single computer system or the modules may be implemented by several computer systems which are in either local or remote communication with one another.

Storage media include various types of local or remote memory devices such as a hard disk, RAM, flash memory, and other magnetic, optical, physical, or electronic memory devices. The processor may be any known computer processor for performing calculations and directing other functions for performing input, output, calculation, and display of data in accordance with the disclosed methods. In various embodiments, implementation of the disclosed methods includes generating sets of instructions and data (e.g. including image data and numerical data) that are stored on one or more of the storage media and operated on by a controller, where the controller may be configured to implement various embodiments of the disclosed invention.

In use, a user may speak commands which may include, for example, single words, phrases, or other vocalizations, where the commands may be selected from a predetermined set of words, phrases, or other vocalizations. In various embodiments, the total number of commands may be 10, 20, 50, 100, 200, 500, 1000, or any other suitable number. The spoken words or commands are sensed by an audio pickup such as a microphone to produce an audio signal. The audio signal is then transmitted (e.g. in a digital format) to a computer system 100 to perform automated speech recognition. A signal may be obtained from a recording device or may be obtained by receiving a signal, e.g. as a digital file, that was recorded elsewhere. The various stages of the automated speech recognition methods disclosed herein may be performed on a single computer system 100 or the stages may be divided among several computer systems 100. The input audio signal is processed as disclosed above to produce a spike sequence and this spike sequence is compared to one or more spike sequences generated from training data (generally under low-noise or noise-free conditions, although various other types of training data may be used instead of, or in addition to, that obtained under low-noise or noise-free conditions). The training data corresponds to one or more speech elements, such as vocal commands that are suitable for the particular application with which the automated speech recognition procedure is being used. When a best match for a training template is determined, the computer system 100 may either directly proceed with performing an action as prescribed by the command associated with the training template or the computer system 100 may first request the user to confirm that the correct command had been identified.

In the examples discussed above the speech elements are numbers, however in other embodiments the speech elements can be commands such as "stop", "start", "on", "off", etc. as appropriate to the particular application. While the examples herein use English language words, various embodiments of the disclosed invention may be used with other languages as well.

REFERENCES

Each of the following references is incorporated herein by reference in its entirety:

Bergroth, L., Hakonen, H., and Raita, T. (2000). A survey of longest common subsequence algorithms. In String Processing and Information Retrieval, 2000. SPIRE 2000. Proceedings. Seventh International Symposium on, page 39-48.

Gemmeke, J. F. and Cranen, B. (2008). Using sparse representations for missing data imputation in noise robust speech recognition. Proc. of EUSIPCO 2008.

Hirsch, H.-G. and Pearce, D. (2000). The Aurora experimental framework for the performance evaluation of speech recognition systems under noisy conditions. In ASR2000-Automatic Speech Recognition: Challenges for the new Millenium ISCA Tutorial and Research Workshop (ITRW).

Leonard, R. (1984). A database for speaker-independent digit recognition. In Acoustics, Speech, and Signal Processing, IEEE International Conference on ICASSP'84., volume 9, page 328-331.

Vapnik, V. N. (1998). Statistical learning theory. Wiley-Interscience.

Wang, D. and Narayanan, S. S. Robust speech rate estimation for spontaneous speech. Audio, Speech, and Language Processing, IEEE Transactions on, 15(8):2190-2201, 2007.

Yuan, J. and Liberman, M. (2008). Speaker identification on the SCOTUS corpus. Journal of the Acoustical Society of America, 123(5):3878.

Mermelstein, P. Automatic segmentation of speech into syllabic units. The Journal of the Acoustical Society of America, 58:880, 1975.

Campbell, N. Automatic detection of prosodic boundaries in speech. Speech communication, 13(3):343-354, 1993.

Pfitzinger, H. R., Burger, S., and Heid, S. Syllable detection in read and spontaneous speech. In Spoken Language, 1996. ICSLP 96. Proceedings., Fourth International Conference on, volume 2, page 1261-1264, 1996.

Morgan, N., Fosler-Lussier, E., and Mirghafori, N. Speech recognition using on-line estimation of speaking rate. In Eurospeech, volume 97, page 2079-2082, 1997.

Faltlhauser, R., Pfau, T., and Ruske, G. On-line speaking rate estimation using gaussian mixture models. In Acoustics, Speech, and Signal Processing, 2000. ICASSP'00. Proceedings. 2000 IEEE International Conference on, volume 3, page 1355-1358, 2000.

Howitt, A. W. Automatic syllable detection for vowel landmarks. 2000.

Xie, Z. and Niyogi, P. Robust acoustic-based syllable detection. In INTERSPEECH, 2006

Various features and advantages of the invention are set forth in the following claims.

What is claimed is:

1. A method implemented by a computing device for automatically recognizing speech in a noisy environment, the method comprising:
obtaining an auditory signal from the noisy environment;

processing the auditory signal into a plurality of frequency components;

processing the plurality of frequency components using a plurality of artificial neurons, each one of the plurality of artificial neurons producing a feature detector response that corresponds to a simulated auditory neuron response to speech;

generating a spike for each instance in which a feature detector response identifies a characteristic spectro-temporal pattern to produce a sparse test spike pattern for the auditory signal, wherein the spike represents speech in terms of an appearance of the characteristic spectro-temporal pattern contained in a segment of speech as a function of time;

weighting the feature detector response corresponding to the spike such that each feature detector response discriminates spectro-temporal features at particular times in a speech element to spectro-temporal features in other speech elements;

selecting a group of the plurality of artificial neurons such that a sequential production of feature detector responses is generated by the group for a given speech element, wherein each feature detector response occurs once during the given speech element, creating the sparse test spike pattern representative of the given speech element;

comparing the sparse test spike pattern to a plurality of predetermined sparse spike patterns corresponding to a plurality of speech elements;

determining that the auditory signal includes one of the plurality of speech elements based on the comparing;

generating a plurality of neuron labels corresponding to the plurality of speech elements; and outputting a plurality of neuron labels to a device that implements the plurality of neuron labels in detecting speech elements in a noisy signal.

2. The method of claim 1, wherein processing the plurality of frequency components using the plurality of artificial neurons comprises inputting a plurality of time-delayed copies of each of the plurality of frequency components to the plurality of artificial neurons.

3. The method of claim 1, wherein comparing the sparse test spike pattern to the plurality of predetermined spike patterns comprises:
    determining a longest common subsequence between the spike test pattern and each of the plurality of predetermined spike patterns,
    accessing an expected distribution of a length of the longest common subsequence due to noise by randomly shuffling the plurality of predetermined spike patterns,
    determining a statistical significance of the length of the longest common subsequence between the sparse test spike pattern and the expected distribution, and
    identifying one of the plurality of speech elements based on the longest common subsequence.

4. The method of claim 3, wherein identifying the speech element based on the longest common subsequence further comprises calculating a similarity score.

5. The method of claim 1, wherein processing the auditory signal into the plurality of frequency components comprises processing the auditory signal into the plurality of frequency components using a plurality of gammatone filters or calculating a spectrogram by computing a short-time Fourier transform of the auditory signal.

6. The method of claim 5, wherein the gammatone filters have center frequencies from about 100 Hz to about 4000 Hz.

7. The method of claim 1, wherein one of the auditory signal speech elements comprises a spoken word.

8. The method of claim 1, wherein each of the plurality of predetermined spike patterns comprises a plurality of feature detector response spikes in a sparse ordered sequence.

9. The method of claim 1, wherein the plurality of artificial neurons comprises a first artificial neuron and wherein the predetermined spike pattern is generated by a training procedure comprising
    obtaining auditory signal positive training data and auditory signal negative training data,
    processing the auditory signal positive training data into a plurality of positive training frequency components,
    processing the auditory signal negative training data into a plurality of negative training frequency components,
    providing the positive training frequency components and the negative training frequency components as inputs to the first artificial neuron,
    weighting the inputs to the first artificial neuron using a weighting vector to produce a first feature detector response, and
    adjusting the weighting vector such that the first feature detector response produces a spike in response to the positive training frequency components and does not produce a spike in response to the negative training frequency components.

10. The method of claim 9, wherein the auditory signal positive training data comprises less than 100 ms of an auditory signal.

11. The method of claim 9, wherein the auditory signal negative training data comprises an auditory signal comprising at least one spoken word.

12. The method of claim 9, wherein the auditory signal positive training data comprises clean speech data.

13. The method of claim 1, wherein comparing the sparse test spike pattern to the plurality of predetermined spike patterns corresponding to the plurality of speech elements comprises comparing the sparse test spike pattern to the plurality of predetermined spike patterns corresponding to a plurality of speech elements using a hidden Markov model.

14. The method of claim 1, wherein generating the spike for each instance in which each feature detector response identifies the characteristic spectro-temporal pattern comprises generating a spike for each instance in which the feature detector response exceeds a predetermined threshold.

15. The method of claim 1, wherein obtaining the auditory signal comprises identifying a syllable of speech within the auditory signal.

16. The method of claim 15, wherein identifying the syllable of speech within the auditory signal comprises:
    identifying a plurality of peaks of acoustic energy of the auditory signal, and
    identifying a plurality of minima between the plurality of peaks, wherein a portion of the auditory signal between adjacent minima comprises a syllable of speech.

17. The method of claim 16, wherein identifying the plurality of peaks of acoustic energy of the auditory signal comprises at least one of smoothing the auditory signal and normalizing the auditory signal.

18. The method of claim 16, wherein identifying the plurality of peaks of acoustic energy of the auditory signal comprises conditioning the auditory signal, wherein conditioning is selected from the group consisting of: compression, smoothing, normalization, thresholding, false-peak elimination, fitting, and start/end pause priors.

19. A system for automatically recognizing speech in a noisy environment, the system comprising:
an acquisition module to obtain an auditory signal from the noisy environment; and
a controller in operative communication with the acquisition module, the controller being configured to:
obtain an auditory signal from the acquisition module,
process the auditory signal into a plurality of frequency components,
process the plurality of frequency components using a plurality of artificial neurons, each one of the plurality of artificial neurons producing a feature detector response that corresponds to a simulated auditory neuron response to speech,
generate a spike for each instance in which a feature detector response identifies a characteristic spectro-temporal pattern to produce a sparse test spike pattern for the auditory signal, wherein the spike represents speech in terms of an appearance of the characteristic spectro-temporal pattern contained in a segment of speech as a function of time,
weight the feature detector response corresponding to the spike such that each feature detector response discriminates spectro-temporal features at particular times in a speech element to spectro-temporal features in other speech elements;
select a group of the plurality of artificial neurons such that a sequential production of feature detector responses is generated by the group for a given speech element, wherein each feature detector response occurs once during the given speech element, creating the sparse test spike pattern representative of the given speech element,
compare the sparse test spike pattern to a plurality of predetermined sparse spike patterns corresponding to a plurality of speech elements,
determine that the auditory signal includes one of the plurality of speech elements based on the comparing,
generate a plurality of neuron labels corresponding to the plurality of speech elements; and
output a plurality of neuron labels to a device that implements the plurality of neuron labels in detecting speech elements in a noisy signal.

20. The system of claim 19, wherein the controller, in order to process the plurality of frequency components using the plurality of artificial neurons, is further configured to input a plurality of time-delayed copies of each of the plurality of frequency components to the plurality of artificial neurons.

21. The system of claim 19, wherein the controller, in order to compare the sparse test spike pattern to a plurality of predetermined spike patterns, is further configured to:
determine a longest common subsequence between the spike test pattern and each of the plurality of predetermined spike patterns,
access an expected distribution of a length of the longest common subsequence due to noise by randomly shuffling the plurality of predetermined spike patterns,
determine a statistical significance of the length of the longest common subsequence between the sparse test spike pattern and the expected distribution, and
identify the speech element based on the longest common subsequence.

22. The system of claim 21, wherein the controller, in order to identify the speech element based on the longest common subsequence, is further configured to calculate a similarity score.

23. The system of claim 19, wherein the controller, in order to process the auditory signal into a plurality of frequency components, is further configured to process the auditory signal into a plurality of frequency components using a plurality of gammatone filters or to calculate a spectrogram by computing a short-time Fourier transform of the auditory signal.

24. The system of claim 23, wherein the gammatone filters have center frequencies from about 100 Hz to about 4000 Hz.

25. The system of claim 19, wherein the auditory signal speech element comprises a spoken word.

26. The system of claim 19, wherein each of the plurality of predetermined spike patterns comprises a plurality of feature detector response spikes in an ordered sequence.

27. The system of claim 19, wherein the plurality of artificial neurons comprises a first artificial neuron and wherein the controller, in order to generate the predetermined spike pattern, is further configured to
obtain auditory signal positive training data and auditory signal negative training data,
process the auditory signal positive training data into a plurality of positive training frequency components,
process the auditory signal negative training data into a plurality of negative training frequency components,
provide the positive training frequency components and the negative training frequency components as inputs to the first artificial neuron,
weight the inputs to the first artificial neuron using a weighting vector to produce a first feature detector response, and
adjust the weighting vector such that the first feature detector response produces a spike in response to the positive training frequency components and does not produce a spike in response to the negative training frequency components.

28. The system of claim 27, wherein the auditory signal positive training data comprises less than 100 ms of an auditory signal.

29. The system of claim 27, wherein the auditory signal negative training data comprises an auditory signal comprising at least one spoken word.

30. The system of claim 27, wherein the auditory signal positive training data comprises clean speech data.

31. The system of claim 19, wherein the controller, in order to compare the sparse test spike pattern to a plurality of predetermined spike patterns corresponding to a plurality of speech elements, is further configured to compare the sparse test spike pattern to a plurality of predetermined spike patterns corresponding to a plurality of speech elements using a hidden Markov model.

32. The system of claim 19, wherein the controller, in order to generate a spike for each instance in which a feature detector response identifies a characteristic spectro-temporal pattern, is further configured to generate a spike for each instance in which a feature detector response exceeds a predetermined threshold.

33. A method implemented by a computing device for automatically recognizing continuous speech in a noisy environment, the method comprising:
obtaining an auditory signal comprising a plurality of syllables of speech from the noisy environment;

identifying a syllable within the auditory signal, the syllable comprising a portion of the auditory signal;

processing the syllable into a plurality of frequency components;

processing the plurality of frequency components using a plurality of artificial neurons, each one of the artificial neurons producing a feature detector response;

generating a spike for each instance in which a feature detector response identifies a characteristic spectro-temporal pattern to produce a sparse test spike pattern for the auditory signal, wherein the spike represents speech in terms of an appearance of the characteristic spectro-temporal pattern contained in the syllable as a function of time;

weighting the feature detector response corresponding to the spike such that each feature detector response discriminates spectro-temporal features at particular times in a speech element to spectro-temporal features in other speech elements;

selecting a group of the plurality of artificial neurons such that a sequential production of feature detector responses is generated by the group for a given speech element, wherein each feature detector response occurs once during the given speech element, creating the sparse test spike pattern representative of the given speech element;

comparing the sparse test spike pattern to a plurality of predetermined spike patterns corresponding to a plurality of speech elements;

determining that the syllable corresponds to one of the plurality of speech elements based on the comparing;

generating a plurality of neuron labels corresponding to the plurality of speech elements; and outputting a plurality of neuron labels to a device that implements the plurality of neuron labels in detecting speech elements in a noisy signal.

34. The method of claim 33, wherein identifying the syllable within the auditory signal comprises:

identifying a plurality of peaks of acoustic energy of the auditory signal, and identifying a plurality of minima between the plurality of peaks, wherein a portion of the auditory signal between adjacent minima comprises the syllable.

35. The method of claim 34, wherein identifying the plurality of peaks of acoustic energy of the auditory signal comprises at least one of smoothing and normalizing the auditory signal.

36. The method of claim 34, wherein identifying the plurality of peaks of acoustic energy of the auditory signal comprises conditioning the auditory signal, wherein conditioning is selected from the group consisting of: compression, smoothing, normalization, thresholding, false-peak elimination, fitting, and start/end pause priors.

37. The method of claim 33, wherein one of the plurality of speech elements comprises a first syllable and a second syllable, and wherein the syllable identified within the auditory signal corresponds to the first syllable or the second syllable.

* * * * *